UNITED STATES PATENT OFFICE 2,228,668

DRYING OIL COMPOSITION

George D. Martin, Nitro, W. Va., assignor to Monsanto Chemical Company, St. Louis, Mo., a corporation of Delaware No Drawing. Application December 30, 1938,
Serial No. 248,583

9 Claims. (Cl. 134—1)

The present invention relates to a coating composition and more particularly to a coating composition containing a drying oil such as, for example, paint, varnish, enamel and the like.

It is common knowledge that many paints tend to form a film or "skin" over the surface when exposed in bulk to the air and often during storage in closed containers. This property is particularly noticeable in the presence of certain pigments and with compositions containing appreciable quantities of China wood oil or polymerized linseed oil. The prevention of skinning is a problem of great importance in dipping operations since the paint is necessarily exposed to the oxidizing action of the atmosphere during such procedure. Some compositions with otherwise desirable properties are not suitable for this type of work because of the rapid formation of a skin over the surface.

A small proportion of a positive oxidation catalyst is usually incorporated in paint compositions in order to obtain a hard dry film in a relatively short time. The dryer is usually a salt of a heavy metal such as lead, manganese or cobalt and the incorporation of this so-called dryer results in certain objectionable properties as well as the desirable property of faster drying. Thus, there is a marked tendency of the paint to skin rapidly upon standing in an open container and also during storage. Furthermore, the oxidation of the dry film continues beyond the desired stage with resultant deterioration and cracking.

It is an object of the present invention to provide a drying oil composition of improved properties.

Another object is to provide a drying oil composition of improved resistance to skinning in bulk or in the container.

A further object is to provide a coating composition comprising a drying oil and possessing improved properties.

A still further object is to provide a class of materials which substantially prevent undesirable oxidation of drying oil compositions. Other objects will be hereinafter shown.

In accordance with the present invention it has been discovered that the phosphoric esters of polyhydric phenols are important and desirable adjuvants to drying oil coating compositions. These products, in general, are obtainable by reacting a polyhydric phenol with a pentavalent phosphorus compound capable of forming an ester, as for example phosphorus pentachloride, phosphorus oxy chloride, phosphorus pentoxide, and in some instances phosphoric acid itself. From the reaction of polyhydric phenols and phosphorus halides both halogen and neutral esters are obtainable and both types have been found to be effective and are included within the scope of the present invention.

Typical examples of the preferred class of compounds include o-phenylene phosphoric acid chloride

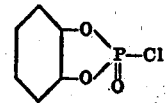

o-phenylene phosphate

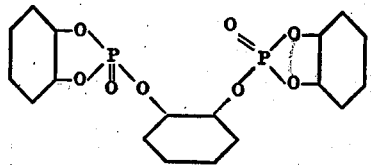

p-hydroxy phenyl o-phenylene phosphate

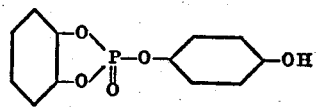

p-phenylene di(phosphoric acid dichloride)

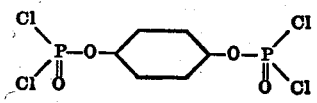

5-hydroxy 1-naphthyl phosphoric acid

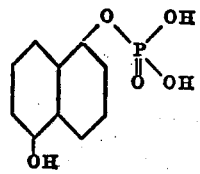

di butyl p-hydroxy phenyl phosphate

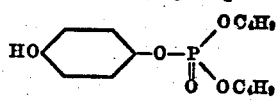

amyl o-phenylene phosphate

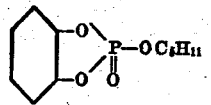

and equivalents and analogues thereof.

As one method of operating the present invention, portions of a paint, varnish or enamel which readily skins on contact with the air, were placed in a suitable container, a small proportion of one of the new class of antiskinning agents incorporated therein and observations made at regular intervals as to the skinning of the composition, whereby it was found that the new and preferred class of antiskinning agents prevented the formation of a skin for extended periods of time.

As a specific embodiment of the present invention 20 grams of a quick drying enamel comprising a 25 gallon China wood oil varnish containing 2.5% of a mixed lead manganese and cobalt dryer was placed in a wide mouth open container of 50 c.c. capacity. 20 milligrams of antiskinning agent was incorporated therein and a comparison made as to the skinning time of the same enamel containing no inhibitor of skin formation, a temperature of 25° C. being maintained throughout the test. Results exemplary of the properties of the preferred class of materials when tested in the manner defined above are given in the table.

Table

| Antiskinning agent | Concentration employed, percent | Days before formation of skin |
|---|---|---|
| Blank | | 1 |
| o-Phenylene phosphoric acid chloride | 0.1 | 21 |
| o-Phenylene phosphate | 0.1 | 17 |
| Amyl o-phenylene phosphate | 0.1 | 35 |

The above data exemplify the highly efficacious action of the preferred materials in preventing the formation of a skin on coating compositions containing a drying oil. While the specific examples given above are derived from unsubstituted polyhydric phenols, it is to be understood that the present invention comprises products derived from substituted polyhydric phenols as well, such as for example, alkyl substituted, chlor substituted and the like.

The present invention is not limited to the specific examples herein given to illustrate the invention. It is obvious that where convenient or desirable mixtures comprising one or more of the preferred materials may be employed to prevent skin formation. For example, reaction products containing both halogen and neutral esters may be employed thereby saving the time and expense of a separation where such is not readily effected. While the amount of antiskinning agent employed in the specific embodiments of the invention as set forth above is 0.1% based on the weight of the total drying oil composition, the quantities employed may be varied depending on the specific composition of the coating material. Generally it is found that less than 1% of the preferred material will be sufficient. Ordinarily 0.05 to 0.50% is sufficient. It is obvious that the processes and compositions described herein may be varied widely in their details without departing from the spirit or scope of the present invention. The present invention is limited solely by the appended claims.

What is claimed is:

1. A coating composition containing a drying oil having incorporated therein a phosphoric ester of a polyhydric phenol.

2. A coating composition containing a drying oil having incorporated therein a halogen containing phosphoric ester of a polyhydric phenol.

3. A coating composition containing a drying oil having incorporated therein a neutral phosphoric ester of a polyhydric phenol.

4. A coating composition containing a drying oil having incorporated therein a halogen containing phosphoric ester of a dihydric phenol.

5. A coating composition containing a drying oil having incorporated therein a neutral phosphoric ester of a dihydric phenol.

6. A coating composition containing a drying oil having incorporated therein an o-phenylene phosphoric ester.

7. A coating composition containing a drying oil having incorporated therein o-phenylene phosphoric acid chloride.

8. A coating composition containing a drying oil having incorporated therein o-phenylene phosphate.

9. A coating composition containing a drying oil having incorporated therein amyl o-phenylene phosphate.

GEORGE D. MARTIN.